A. O. WYRILL.
SIGNALING APPARATUS.
APPLICATION FILED DEC. 1, 1916.
1,321,968.
Patented Nov. 18, 1919.
2 SHEETS—SHEET 1.
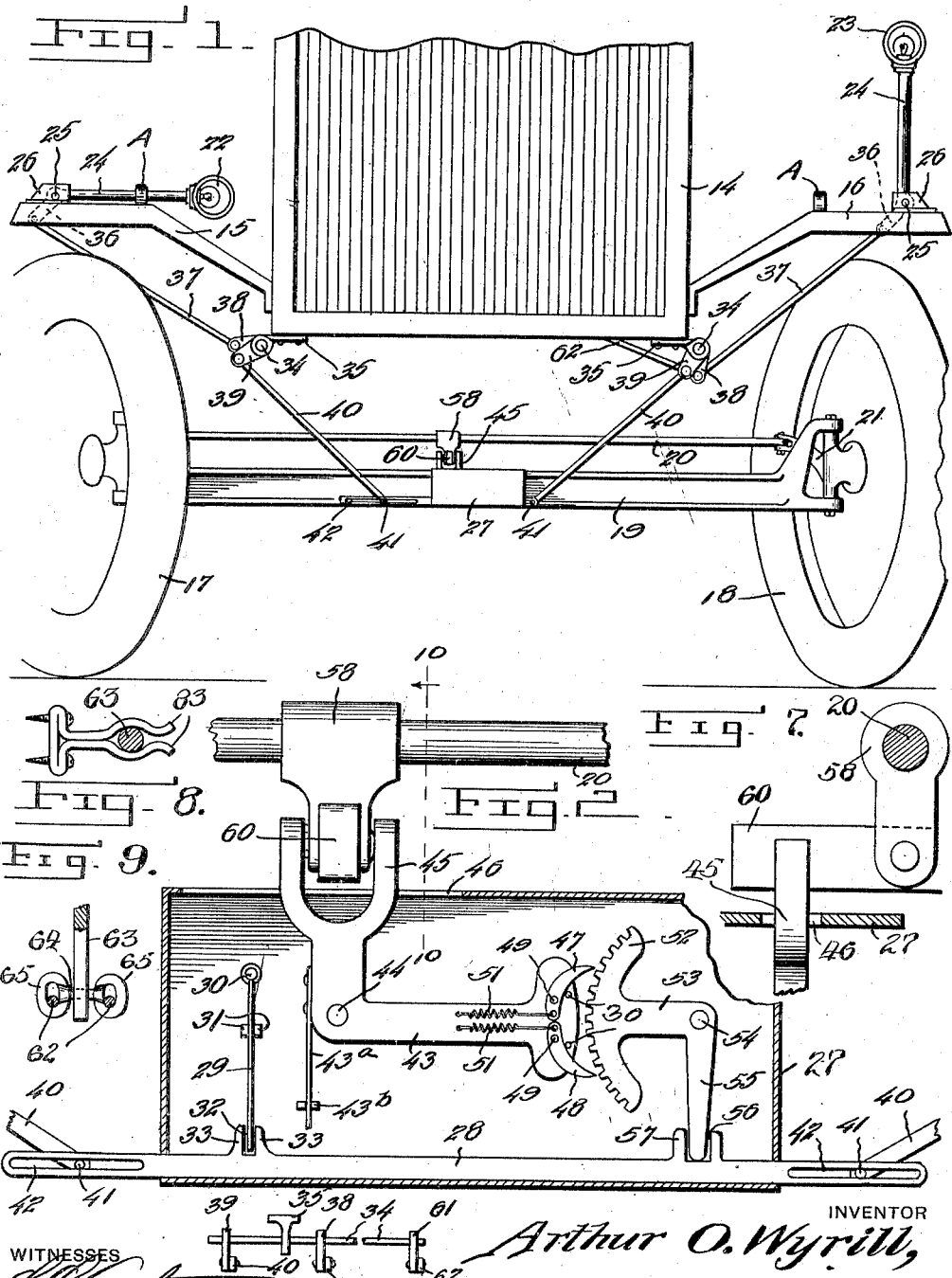
INVENTOR
Arthur O. Wyrill,
BY Richard B. Owen,
ATTORNEY
WITNESSES

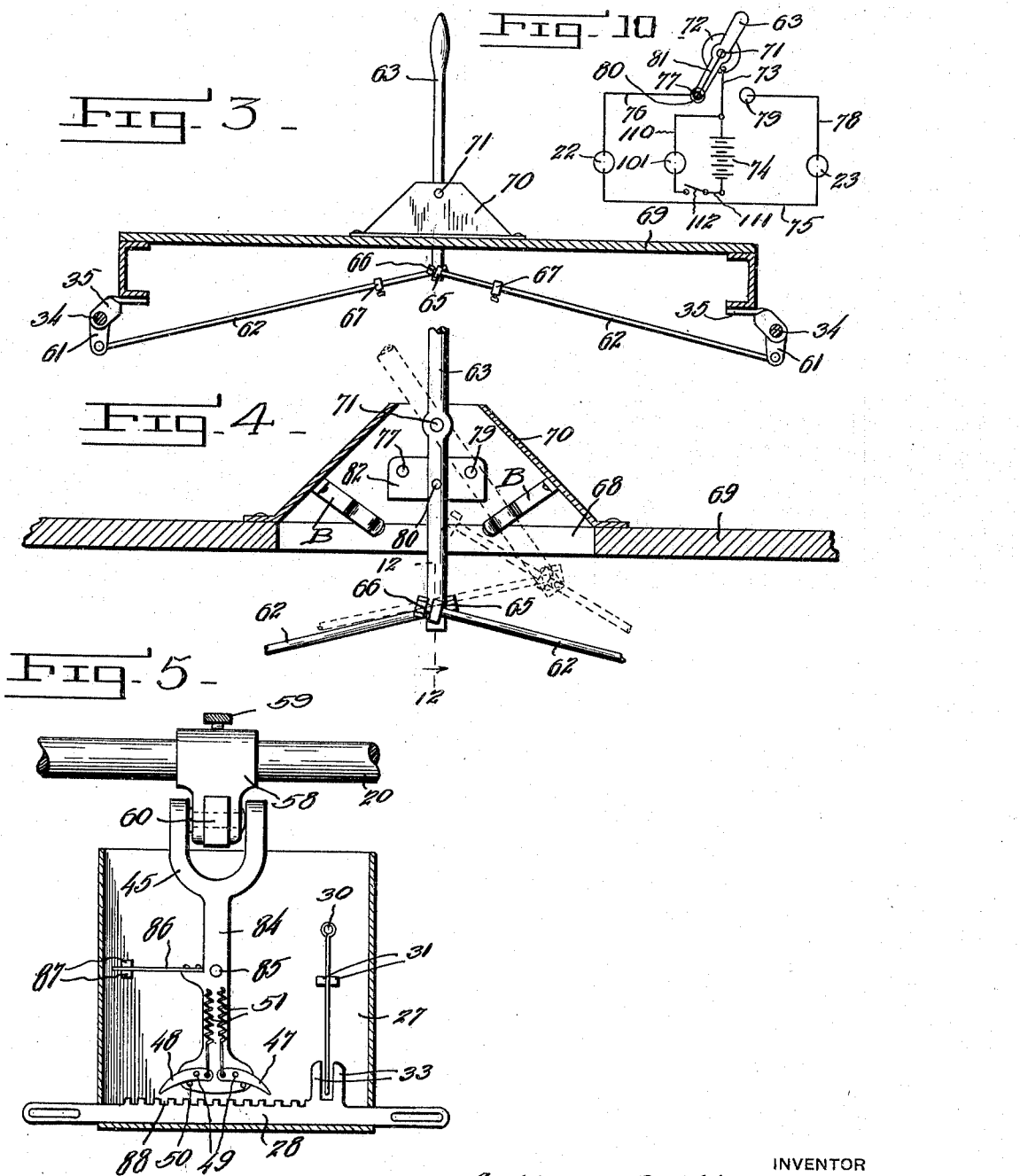

UNITED STATES PATENT OFFICE.

ARTHUR O. WYRILL, OF PALESTINE, TEXAS.

SIGNALING APPARATUS.

1,321,968. Specification of Letters Patent. Patented Nov. 18, 1919.

Application filed December 1, 1916. Serial No. 134,353.

*To all whom it may concern:*

Be it known that I, ARTHUR O. WYRILL, a citizen of the United States, residing at Palestine, in the county of Anderson and State of Texas, have invented certain new and useful Improvements in Signaling Apparatus, of which the following is a specification.

My invention relates to a signaling apparatus for use on automobiles and other vehicles, particularly to apprise the public of a contemplated turn and the direction of turning in advance of the turning of the vehicle.

While I generally aim to provide an apparatus which attains said end and which is novel, efficient and durable and capable of manufacture and installation at minimum cost, yet I particularly aim to provide a signal in the form of a lamp which is raised and illuminated before turning of the vehicle; a novel means to lower the signal through movement of steering means of the vehicle; to provide the specific construction to accomplish the last mentioned end as hereinafter described; to provide means to control the lighting of the signal lamp means which is manually operable as an emergency operating means for the signaling means; and additional objects mostly servient to those stated, which will appear hereinafter in connection with accompanying drawings illustrating one preferred embodiment and considered with reference to the following description.

In said drawings:

Figure 1 is a fragmentary front view of an automobile in the act of turning, and having my improvements associated therewith;

Fig. 2 is a fragmentary view partly in vertical section and partly in side elevation illustrating most of the mechanism for operating the signaling means;

Fig. 3 is a view partly in elevation and partly in section showing the combined switch mechanism, emergency operating means, of the signaling mechanism;

Fig. 4 is a view partly showing the combined switch and emergency operating means of the signaling means, taken on a larger scale than Fig. 3;

Fig. 5 is a view partly in elevation and partly in vertical section showing a modified form of operating means for the signaling means;

Fig. 6 is a fragmentary elevation of one of the turnable shafts and cranks thereon used as parts of the signaling means;

Fig. 7 is a cross sectional view on the line 10—10 of Fig. 2;

Fig. 8 is a plan view of one of the clasps which may be used to fasten the lever of Figs. 3 and 4 against movement and also to fasten the signaling lamps in lowermost position;

Fig. 9 is a cross sectional view on the line 12—12 of Fig. 4, and

Fig. 10 is a diagrammatic view showing one electric circuit means for the different lamps employed.

Referring specifically to the drawings, wherein like reference characters designate like or similar parts, an automobile is fragmentarily shown, best in Fig. 1, of which 14 is the radiator, 15 and 16, respectively, the right hand and left hand fenders for the front wheels respectively designated 17 and 18, and for which 19 may be the usual axle beam. 20 is the horizontally disposed connecting rod which connects with cranks like 21 of the wheel axles and moves with said cranks and with the wheels.

Of the signaling mechanism, I employ electric lamps 22 and 23, each of which is mounted from a post or standard 24 which is pivoted at 25 to a bracket 26 mounted upon the fenders 15 and 16.

Normally the lamps and their posts or standards are adapted to lie in a horizontal plane or in lowered position as suggested by the lamp shown to the left in Fig. 1, and with the light extinguished. When these lamps signal, they assume a vertical position as shown by the right hand lamp in Fig. 1. I preferably provide suitable mechanisms operable manually and through movement of the steering gear respectively to control the position of the lamps or signals.

When connected with said means I may employ a suitably shaped casing 27, supported from a suitable part of the vehicle, and preferably from the front and centrally of the beam 19. A slide 28 is mounted for movement longitudinally within the casing 27 as suggested in Figs. 1 and 2. This slide 28 is normally held in a neutral position by means of a blade or leaf spring 29 fastened at 30 to the casing 27 and passing through abutment lugs 31 of the casing and into a slot 32 of the slide 28, formed by lugs 33, one of which is adapted to abut one end wall of the casing and limit movement of the slide in one direction.

The signaling lamps and their posts 24 are adapted to be lowered operated in part through movement of the slide 28. To this end two rock shafts 34 are disposed longitudinally of the automobile, being supported in any suitable manner, as by bearings 35. Each post 24 has a crank 36. Rods 37 are pivoted to the cranks 36 and in turn to cranks 38, rigid with the rock shaft 34. Also rigid with the rock shafts 34 are cranks 39 having rods 40 pivoted thereto and also pivoted by pins 41 to the slide 28. Pins 41 pass through elongated slots 42 of the slide. As a result of the latter construction, the slide may move in either direction and operate but one of the signals 22 or 23, and without injuring the other signal.

Within the casing 27, a lever 43 is pivoted at 44, having a yoke 45 extending through and above and movable in an elongated slot 46 in the top wall of the casing. At the inner end of lever 43, pawls 47 and 48 are pivoted on pins 49 of the lever. The movement of the pawls in one direction is limited by abutment pins 50 at the inner ends, rather strong springs 51 are connected to pawls 47 and 48 and also to the lever 43. These springs 51 urge the pawls into engagement with the abutments 50. Coöperating with the pawls 47 and 48 is a notched segment 52 forming part of a bell crank lever 53 pivoted to casing 27 at 54, and having one arm 55 extending into a slot 56 of the slide 28 provided intermediate lugs 57 thereon and one of which is adapted to abut one end wall of the casing 27 to limit the movement of the slide in one direction.

On the rod 20 a lug 58 is slidably mounted, but normally fastened against movement by means of a set screw 59 which frictionally engages the rod. Fastened to the lugs 58 and extending at a right angle thereto, is a lug 60 which extends into the yoke 45 and moves the yoke, tilting the lever 43 according to the direction of movement of rod 20.

Cranks 61 are rigidly secured to the rock shaft 34 and rods 62 are pivoted to the cranks 61 for upward or vertical swinging. A lever is provided at 63 having a pin 64 fastened thereto and on which pin swivels 65 are suitably journaled for independent movement. Rods 62 from opposite directions, extend through the swivels 65, loosely, as the openings of the swivel are enlarged relatively to the rods. Beyond the swivels, suitable nuts 66 are connected to the rods. Due to the swivel connections, lever 63 may be moved in one direction to draw one rod 62 without drawing the other rod 62. Suitable stops 67 are adjustably secured to the rod 62 for positioning relatively to the lever 63 in order that it may coöperate therewith to operate the signaling lamps 22 or 23, if preferred and especially in the event the automatic means for operating same heretofore described fails to work or is injured.

Lever 63, however, primarily serves as an operating means to raise a signal lamp 24 but also acts as a switch arm and it is preferably disposed relatively close to the driver's seat. It extends upwardly through an enlarged slot 68 in the floor of the automobile 69. Surrounding the slot and extending upwardly therefrom is a housing 70 to which the said lever 63 is pivoted at 71. As previously stated, lever 63 also serves as a switch arm to respectively close the electric circuits through the lamps 22 and 23 according to the direction of turning of the vehicle. Reference should now be had to Figs. 4 and 10. Pivot 71 is in conducting relation with a plate 72 to which a wire 73 connects, leading from a battery 74. A wire or conductor 75 leads from the other pole of the battery both to lamp 22 and to lamp 23. From lamp 22, a conductor 76 leads to a contact 77 while a conductor 78 leads from lamp 23 to a contact 79. On lever 63 a fixed contact 80 is mounted being in conducting relation with contact 71 through the medium of conductor 81. As a result of this construction, switch arm 63 is operable to close the electric circuit through either lamp 22 or 23. As seen in Fig. 4, the contacts 77 and 79 may be carried by a suitable supporting block fastened to the housing 70 and designated 82.

Lever 43 is held in the neutral position by spring 43$^a$ secured thereto and extending intermediate lugs 43$^b$.

It may be mentioned that when the posts 24 are lowered, they are engaged and held by clasps at A. Lever 63 in its adjusted positions may also be engaged by clasps as shown at B. Clasps A and B may be of the same construction, for instance that shown in Fig. 8. This clasp has two suitably shaped outwardly yielding spring arms 82 adapted to hold the article between them.

In operation, say the automobile is to turn to the left as illustrated in Fig. 1 of the drawings. The left hand signal is raised by operating lever 63. The movement of rod 20 through the medium of lug 60 extending into the yoke 45, will tilt lever 43 against the tension of spring 43$^a$ so that it will move upwardly at its opposite end, moving pawl 48 across the teeth of segment 52 and then into a notch thereof. The pawl snugly fits the notch and in effect is locked therein, in view of the provision of its spring 51. When the car has completed its turn, the rod 20 will return to its normal position with lug 60 working in the yoke 45 forcing the opposite ends of bell crank 43 downward, thus moving bell crank 53 which causes slide 28 at the end of one slot 42 to move against pin 41 (at the right of Fig. 2) and causing rod 40 to turn crank 39 on rock shaft 34 which turns crank 38 forcing rod 37 against lever 36 and lowering the left hand signal lamp to neutral position, and extinguishing light by means of the nut 66 on rod 62 which pulls lever 63 back to neutral position. When the wheels turn to the right or direction opposite to that described, the operation of the parts is the reverse to that set forth. It will be noted that when one lamp is being operated to signaling position, the other lamp is not affected by the movement of the parts. Upon the rocking of the shaft 34 during the movement of slide 28, cranks 61 operate, and the proper rod 62 is drawn so as to shift lever 63 into neutral position with its contact 80 engaging either contact 77 or 79 and closing the electric circuit through the proper signaling lamp. It will be understood that when either lamp is raised, the electric circuit therethrough will be closed and that while raised, the lamp is in signaling position to apprise the public that a turn is about to be made, as well as the direction of the turn.

In instances where preferred, or where the automatic signaling and lighting means described fails to work, lever 63 may be operated manually to effect the signaling. It will be realized that through the turning of the lever 63, the proper lamp 22 or 23 will be lighted and that through the movement of rod 62 the shaft 34 will be rocked so as to operate the cranks 38, the rods 37 and cranks 36.

The mechanism shown in Fig. 2 is preferred where the rod 20 or its equivalent is disposed in the rear of the axle beam 19. In instances where this rod 20 or its equivalent is found in front of the axle beam 19, I prefer the construction shown in Fig. 5. In this view, the parts 20, 27, 28, 30, 31, 33, 58, 59 and 60 of the views described, are shown. The yoke 45 in this instance is carried by a lever 84, differing in shape from the lever 43. This lever 84 is pivoted to the casing at 85 and has a leaf spring 86 connected thereto and extending intermediate the lugs 87 provided on the casing. In this instance, the slide 28 is provided with a rack 88, with the notches of which, the pawls 47 and 48 coöperate. These pawls are of the same construction as shown in Fig. 2 and utilize similar pivots 49, lugs 50 and springs 51.

Since merely the preferred embodiment of the invention has been illustrated and described, it is to be understood that changes in the details of construction may be resorted to provided they fall within the spirit and scope of the appended claims.

I claim:

1. Signaling means including a lever, a swivel on said lever, a rod extending from said swivel, a rock shaft, a crank connecting said rod with said rock shaft, and a second crank member connecting the signaling means with the rock shaft, whereby said signal will be operated through movement of the rock shaft.

2. Signaling means including a signal, and means to operate the signal consisting of a movable member, a second movable member, one of said members having a yoke, and the other member having means coöperating with the yoke.

3. Signaling means comprising a lever, means to operate the lever, a bell crank, said bell crank being operatively associated with the lever, a slide operated by the bell crank, and a signal operable through movement of the slide.

4. Signaling means having a movable member, means to move said member, a slide member, one of said members being provided with rack means, and the other of said members being provided with pawl means to engage the rack means, a signal, and means to operate said signal through movement of the slide.

5. Signal means having a signal, a slide member, means to move the signal through movement of the slide member, a lever member, one of said members being provided with a notch, a pawl to engage said notch, said pawl being pivoted on the other member, a stop for said pawl, and a spring to draw said pawl against said stop.

6. Signaling means having a lever, a bell crank, means to operate the bell crank through movement of the lever, a slide driven by said bell crank, and a signal operable through movement of the slide.

7. Signaling means having a lever, a bell crank lever provided with a rack, pawl means on the first mentioned lever, engageable with said rack, a slide, abutment means on the slide engageable by the bell crank lever, and a signal, and means to operate said signal through movement of the slide.

8. Signaling means comprising a lever, means to maintain said lever in a neutral position, means to operate the lever against the tension of said means, a slide, means to maintain the slide in a neutral position, a signal operable through movement of the slide, and means operable by said lever to move said slide.

9. Signaling means comprising a casing provided with an elongated slot, a lever pivoted within the casing and having a yoke extending through and beyond the slot, means to shift the lever engageable with said yoke, a spring to maintain the lever in a neutral position, abutment means on the casing for said spring, a bell crank lever pivoted to the casing, means to drive the bell crank lever through movement of the first mentioned lever, a slide movable within the casing and projecting beyond the ends thereof, said slide having a slot into which said bell crank lever extends, said slide also having a second slot, a spring fastened to said casing extending into said second slot, and a signal operable through movement of said slide.

10. Signaling means comprising a casing provided with an elongated slot, a bell crank lever pivoted within said casing and having a yoke extending through and beyond the slot, means adapted to engage said yoke for moving the lever, means for holding the lever in a neutral position, the opposite end of the lever being provided with a pair of pawls pivotally connected thereto, a second bell crank lever pivoted within the casing, a slide movable within the casing and having its ends projecting beyond the casing, one end of said second lever engaging said slide, the other end being provided with a notched segment which coöperates with the pawls secured to the first mentioned lever, and a signal operable through movement of said slide.

11. Signaling means comprising a casing provided with an elongated slot, a lever pivoted within said casing, means adapted to move said lever, a second lever that coöperates with the first mentioned lever, a slide movable within said casing being operated by the said levers, slots provided in the ends of said slide, a rock shaft, cranks secured to said rock shafts, rods connecting the cranks with the slots in the ends of said slide, a signal, and a rod connecting the signal with the crank, whereby the signal will be operated when the slide is moved.

12. Signaling means comprising a casing, a bell crank lever pivoted within said casing and having a yoke extending therethrough, means adapted to engage said yoke for moving the lever, said lever being provided with a pair of pawls pivotally connected to the opposite end thereof, a second bell crank lever pivoted within the casing and having one end provided with a notched segment which coöperates with the pawls secured to the first mentioned lever, a slide movable through said casing being operated by the opposite end of the second mentioned lever, slots provided in both ends of the slide, a rock shaft, cranks secured to said rock shaft, means connecting a crank with the slot in the slide, and means connecting the signal with a crank whereby the signal will be operated when the slide is moved.

13. Signaling means comprising a casing, a bell crank lever pivotally mounted within the casing and having a yoke extending therethrough, means engaging said yoke for imparting movement to said lever, a pair of spring pawls pivotally secured to the opposite end of the lever, a second bell crank lever having one end provided with a notched segment adapted to coöperate with the said pawls, a slide movable through said casing having a slot formed thereon by intermediate lugs which is adapted to receive the opposite end of the second mentioned lever, means for normally holding the slide in a neutral position, and means extending from the ends of the slide to the signal means whereby the signal is operated when the slide is moved.

14. Signaling means for automobiles comprising a casing, a slide movable through said casing, means within the casing for automatically imparting movement to the slide, slots in the ends of said slide, a rock shaft disposed longitudinally of the automobile and secured thereto, a plurality of cranks rigidly connected to said shaft, a manually operated lever, means connecting one of said cranks with the slot in said slide, means extending from another of said cranks to the said manually operated lever, and means extending from the signaling means and connected to the shaft, whereby when the shaft is rocked the signal will be operated.

In testimony whereof I affix my signature in presence of two witnesses.

ARTHUR O. WYRILL.

Witnesses:
C. W. HANKS,
W. M. KELLER.